US012184678B2

(12) United States Patent
Sevcenko et al.

(10) Patent No.: US 12,184,678 B2
(45) Date of Patent: *Dec. 31, 2024

(54) OPTIMIZED ANALYSIS FOR DETECTING HARMFUL CONTENT

(71) Applicant: UAB 360 IT, Vilnius (LT)

(72) Inventors: Aleksandr Sevcenko, Vilnius (LT); Mantas Briliauskas, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 18/377,573

(22) Filed: Oct. 6, 2023

(65) Prior Publication Data

US 2024/0039933 A1 Feb. 1, 2024

Related U.S. Application Data

(63) Continuation of application No. 17/744,714, filed on May 15, 2022, now Pat. No. 11,843,618, which is a continuation of application No. 17/744,704, filed on May 15, 2022, now Pat. No. 11,601,451.

(51) Int. Cl.
H04L 9/40 (2022.01)
(52) U.S. Cl.
CPC ........ *H04L 63/1416* (2013.01); *H04L 63/145* (2013.01)
(58) Field of Classification Search
None
See application file for complete search history.

(56) References Cited

U.S. PATENT DOCUMENTS

| | | | |
|---|---|---|---|
| 9,049,221 B1 | 6/2015 | Yen et al. | |
| 9,223,972 B1 | 12/2015 | Vincent et al. | |
| 9,348,998 B2* | 5/2016 | Zakorzhevsky | G06F 21/566 |
| 9,521,162 B1 | 12/2016 | Zand et al. | |
| 9,531,736 B1 | 12/2016 | Torres et al. | |
| 9,594,904 B1 | 3/2017 | Jain et al. | |
| 9,635,041 B1 | 4/2017 | Warman et al. | |
| 9,654,485 B1 | 5/2017 | Neumann | |
| 9,690,936 B1 | 6/2017 | Malik et al. | |
| 10,230,749 B1* | 3/2019 | Rostami-Hesarsorkh | G06F 21/56 |
| 10,291,563 B1 | 5/2019 | Wheeler | |
| 10,356,119 B1 | 7/2019 | Chang | |
| 10,462,173 B1 | 10/2019 | Aziz et al. | |

(Continued)

*Primary Examiner* — Khang Do
(74) *Attorney, Agent, or Firm* — The Pattani Law Group

(57) ABSTRACT

A method including determining, by an infrastructure device, a mixed set of harmful traits and clean traits, the harmful traits being associated with affected data known to include harmful content and the clean traits being associated with clean data known to be free of the harmful content; determining, by the infrastructure device, harmful patterns indicating characteristics of the harmful traits based on comparing the affected data with the mixed set, wherein a harmful pattern indicates a particular combination of one or more of the harmful traits; transmitting, by the infrastructure device to a user device, the harmful patterns; determining, by the user device, a determined pattern based at least in part on traits included in given data; and determining, by the user device, whether the given data includes the malicious content based on comparing the determined pattern with the harmful patterns is disclosed. Various other aspects are contemplated.

20 Claims, 7 Drawing Sheets

(56) References Cited

U.S. PATENT DOCUMENTS

| | | |
|---|---|---|
| 10,681,080 B1 | 6/2020 | Chen |
| 10,728,262 B1 | 7/2020 | Vaswani et al. |
| 10,785,255 B1 | 9/2020 | Otvagin et al. |
| 10,893,059 B1 | 1/2021 | Aziz et al. |
| 11,025,649 B1 | 6/2021 | Bilge et al. |
| 11,075,930 B1 | 7/2021 | Xavier et al. |
| 11,082,442 B1 | 8/2021 | Kolman et al. |
| 11,483,330 B1 | 10/2022 | Alotalbi et al. |
| 11,552,986 B1 | 1/2023 | Templeman et al. |
| 11,562,245 B2 | 1/2023 | Ocher et al. |
| 2003/0065926 A1 | 4/2003 | Schultz et al. |
| 2008/0047012 A1 | 2/2008 | Rubin et al. |
| 2010/0229239 A1 | 9/2010 | Rozenberg et al. |
| 2012/0174227 A1 | 7/2012 | Mashevsky et al. |
| 2012/0210423 A1* | 8/2012 | Friedrichs ............. G06F 21/564 726/22 |
| 2013/0312094 A1 | 11/2013 | Zecheru |
| 2014/0096241 A1 | 4/2014 | Li et al. |
| 2015/0180875 A1 | 6/2015 | Kay |
| 2016/0036844 A1 | 2/2016 | Kopp et al. |
| 2016/0381042 A1 | 12/2016 | Zhang |
| 2017/0093897 A1 | 3/2017 | Cochin et al. |
| 2017/0180418 A1 | 6/2017 | Shen et al. |
| 2017/0251003 A1* | 8/2017 | Rostami-Hesarsorkh .................... G06N 5/01 |
| 2017/0310694 A1 | 10/2017 | Kamiya et al. |
| 2017/0353481 A1* | 12/2017 | Kong ................. H04L 63/1425 |
| 2017/0372066 A1* | 12/2017 | Deng .................... G06F 21/562 |
| 2017/0374089 A1 | 12/2017 | Anderson et al. |
| 2018/0097832 A1* | 4/2018 | Viktorov ............ H04L 63/1416 |
| 2018/0191754 A1 | 7/2018 | Higbee et al. |
| 2018/0212992 A1 | 7/2018 | Nikolaev et al. |
| 2018/0293381 A1 | 10/2018 | Tseng et al. |
| 2018/0316706 A1 | 11/2018 | Tsironis et al. |
| 2019/0132334 A1 | 5/2019 | Johns et al. |
| 2019/0173897 A1 | 6/2019 | Okano et al. |
| 2019/0174319 A1* | 6/2019 | Backholm ........... H04L 63/0281 |
| 2019/0199736 A1* | 6/2019 | Howard ............... H04L 63/1425 |
| 2019/0272360 A1 | 9/2019 | Kursun et al. |
| 2019/0297092 A1* | 9/2019 | Shibahara ............. H04L 63/168 |
| 2019/0319977 A1 | 10/2019 | Gottschlich et al. |
| 2019/0362072 A1 | 11/2019 | Kesarwani et al. |
| 2019/0364062 A1* | 11/2019 | Xu ....................... H04L 63/145 |
| 2019/0379696 A1 | 12/2019 | Ludwig et al. |
| 2020/0019702 A1 | 1/2020 | Tong et al. |
| 2020/0034700 A1 | 1/2020 | Mixter |
| 2020/0053123 A1 | 2/2020 | Pliskin et al. |
| 2020/0169577 A1 | 5/2020 | Oh et al. |
| 2020/0236131 A1 | 7/2020 | Vejman et al. |
| 2021/0037027 A1 | 2/2021 | Brown et al. |
| 2021/0049413 A1 | 2/2021 | Ma et al. |
| 2021/0097395 A1 | 4/2021 | Ocher et al. |
| 2021/0149963 A1 | 5/2021 | Agarwal et al. |
| 2021/0281592 A1 | 9/2021 | Givental et al. |
| 2021/0326438 A1 | 10/2021 | Dichiu et al. |
| 2021/0352095 A1 | 11/2021 | Cam |
| 2021/0385232 A1 | 12/2021 | Kutt et al. |
| 2022/0046057 A1 | 2/2022 | Kutt et al. |
| 2022/0116408 A1 | 4/2022 | Healy et al. |
| 2022/0124117 A1 | 4/2022 | Bilugu et al. |
| 2022/0159039 A1 | 5/2022 | Vinayagam et al. |
| 2022/0191244 A1 | 6/2022 | Komarek et al. |
| 2022/0217156 A1 | 7/2022 | Wahbo |
| 2022/0247758 A1* | 8/2022 | Du ...................... H04L 63/1416 |
| 2022/0247786 A1 | 8/2022 | Vavilala et al. |
| 2022/0269977 A1 | 8/2022 | Yu et al. |
| 2022/0272109 A1 | 8/2022 | Szurdi et al. |
| 2022/0414536 A1 | 12/2022 | Nishanth et al. |
| 2023/0047174 A1 | 2/2023 | Pharr et al. |
| 2023/0097770 A1 | 3/2023 | Dimitrova et al. |
| 2023/0114821 A1 | 4/2023 | Thomas et al. |
| 2023/0164567 A1 | 5/2023 | Fellows et al. |
| 2023/0254338 A1* | 8/2023 | Melicher ............. H04L 63/1483 726/13 |

* cited by examiner

OPTIMIZED ANALYSIS FOR DETECTING HARMFUL CONTENT

CROSS REFERENCE

This application is a continuation of U.S. Non-Provisional patent application Ser. No. 17/744,714, filed on May 15, 2022, and titled "Optimized Analysis For Detecting Harmful Content," which is a continuation of U.S. Non-Provisional patent application Ser. No. 17/744,704, filed on May 15, 2022, and titled "Optimized Analysis For Detecting Harmful Content," the entire contents of which applications are incorporated herein by reference.

FIELD OF DISCLOSURE

Aspects of the present disclosure generally relate to cyber security, and more particularly to optimized analysis for detecting harmful content to mitigate the risks associated with cybercrimes.

BACKGROUND

A user device may rely on a network to communicate information and/or to communicate messages with another user device. Such information and/or messages may include private information and/or sensitive data associated with the user device. The communication over the network may be vulnerable as being susceptible to a cybercrime, through which a malicious entity may attempt to steal, alter, disable, expose, or destroy the information through unauthorized access to the communicating user devices. A cybercrime may include, for example, a malware attack, a phishing attack, a ransomware attack, a virus attack, etc. As a result, cyber security measures may be used to prevent occurrence of the cybercrime and/or to mitigate risks associated with the cybercrime.

SUMMARY

In one aspect, the present disclosure contemplates a method including analyzing affected data known to include harmful content to identify harmful traits that are included in the affected data with a frequency that satisfies a threshold frequency; analyzing clean data known to be free of harmful content to identify clean traits that are included in the clean data with a frequency that satisfies the threshold frequency; determining harmful patterns indicating characteristics of the harmful traits included in affected data based at least in part on comparing the affected data with the harmful traits and the clean traits; determining clean patterns indicating characteristics of the clean traits included in clean data based at least in part on comparing the clean data with the harmful traits and the clean traits; and determining whether given data includes the harmful content based at least in part on utilizing the harmful patterns and the clean patterns.

In another aspect, the present disclosure contemplates a device including a memory and a processor communicatively coupled to the memory, the memory and the processor being configured to: analyze affected data known to include harmful content to identify harmful traits that are included in the affected data with a frequency that satisfies a threshold frequency; analyze clean data known to be free of harmful content to identify clean traits that are included in the clean data with a frequency that satisfies the threshold frequency; determine harmful patterns indicating characteristics of the harmful traits included in affected data based at least in part on comparing the affected data with the harmful traits and the clean traits; determine clean patterns indicating characteristics of the clean traits included in clean data based at least in part on comparing the clean data with the harmful traits and the clean traits; and determine whether given data includes the harmful content based at least in part on utilizing the harmful patterns and the clean patterns.

In another aspect, the present disclosure contemplates a non-transitory computer readable medium storing instructions, which when executed by a processor associated with a device, cause the processor to: analyze affected data known to include harmful content to identify harmful traits that are included in the affected data with a frequency that satisfies a threshold frequency; analyze clean data known to be free of harmful content to identify clean traits that are included in the clean data with a frequency that satisfies the threshold frequency; determine harmful patterns indicating characteristics of the harmful traits included in affected data based at least in part on comparing the affected data with the harmful traits and the clean traits; determine clean patterns indicating characteristics of the clean traits included in clean data based at least in part on comparing the clean data with the harmful traits and the clean traits; and determine whether given data includes the harmful content based at least in part on utilizing the harmful patterns and the clean patterns.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
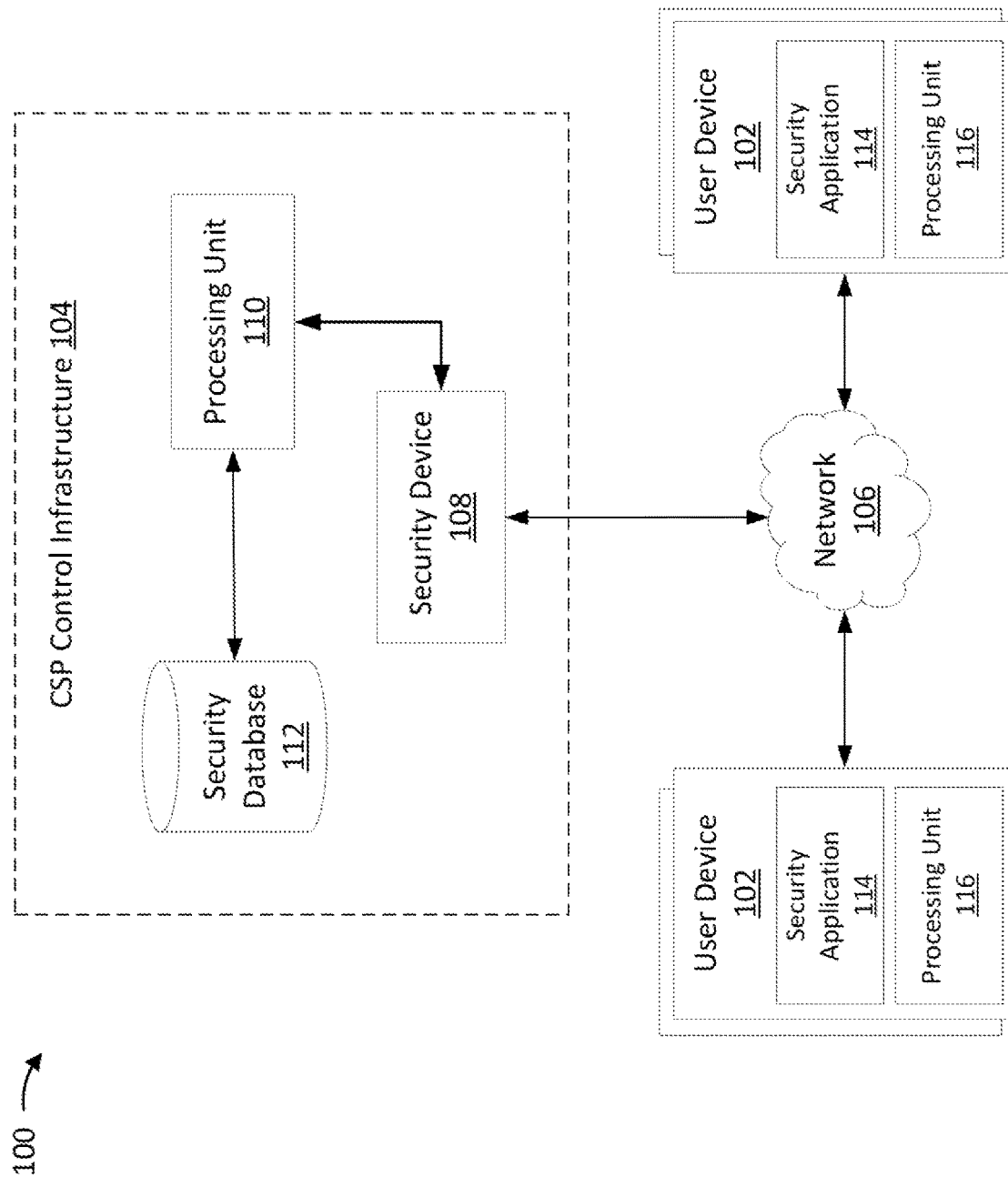

FIG. 1 is an illustration of an example system associated with optimized analysis for detecting harmful content, according to various aspects of the present disclosure.

Figure 2:
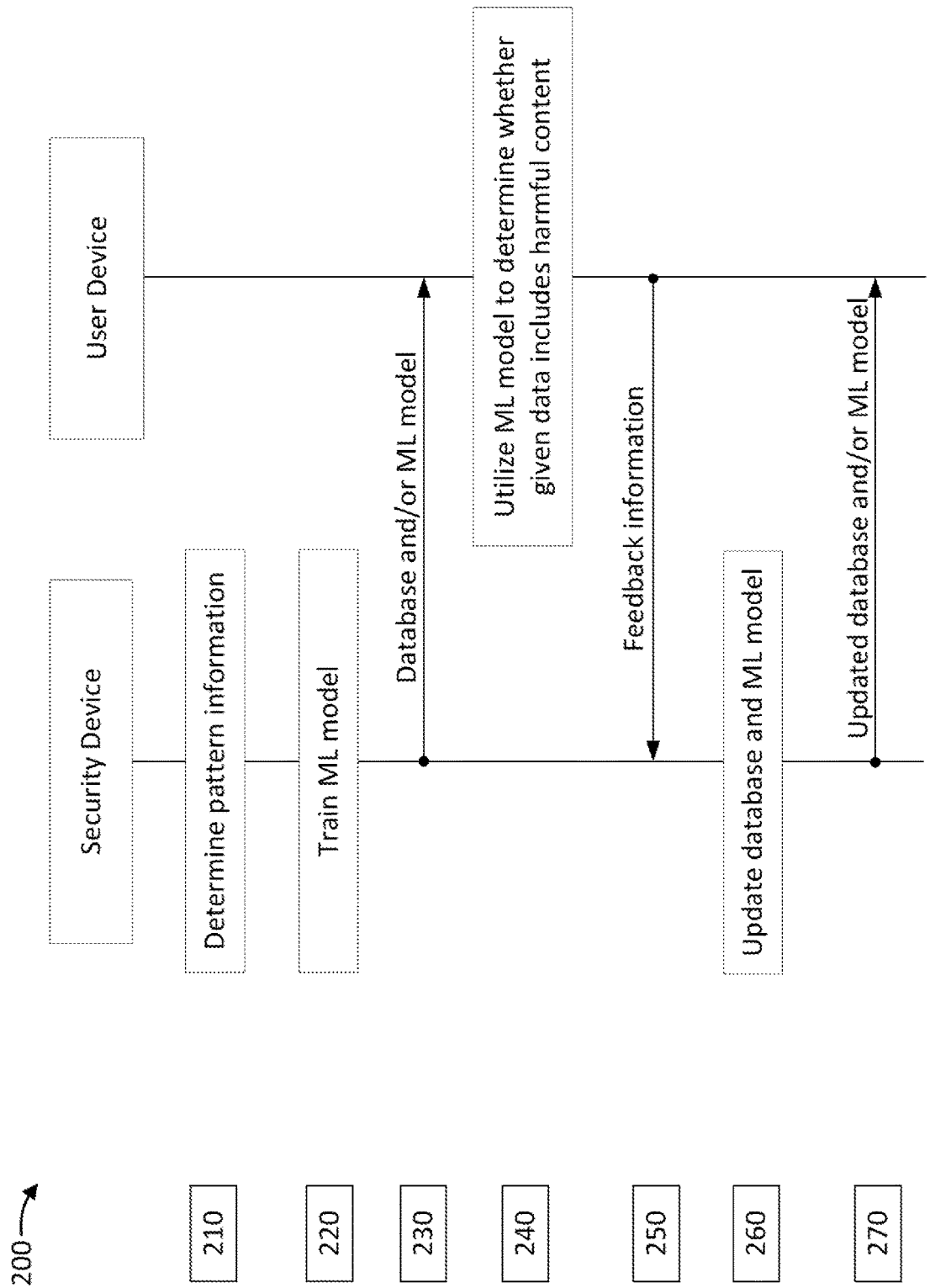

FIG. 2 is an illustration of an example flow associated with optimized analysis for detecting harmful content, according to various aspects of the present disclosure.

Figure 3:
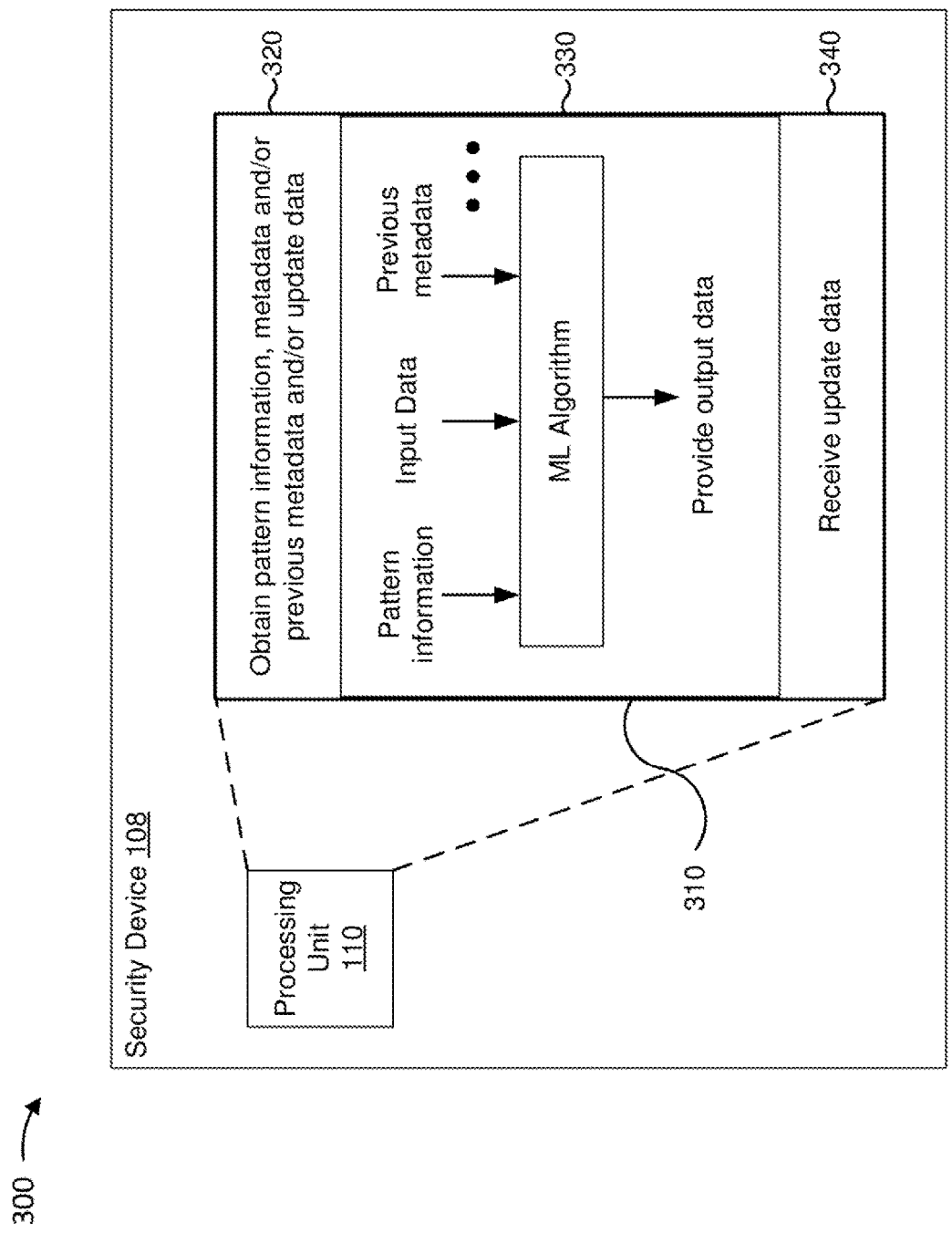

FIG. 3 is an illustration of an example associated with optimized analysis for detecting harmful content, according to various aspects of the present disclosure.

Figure 4:
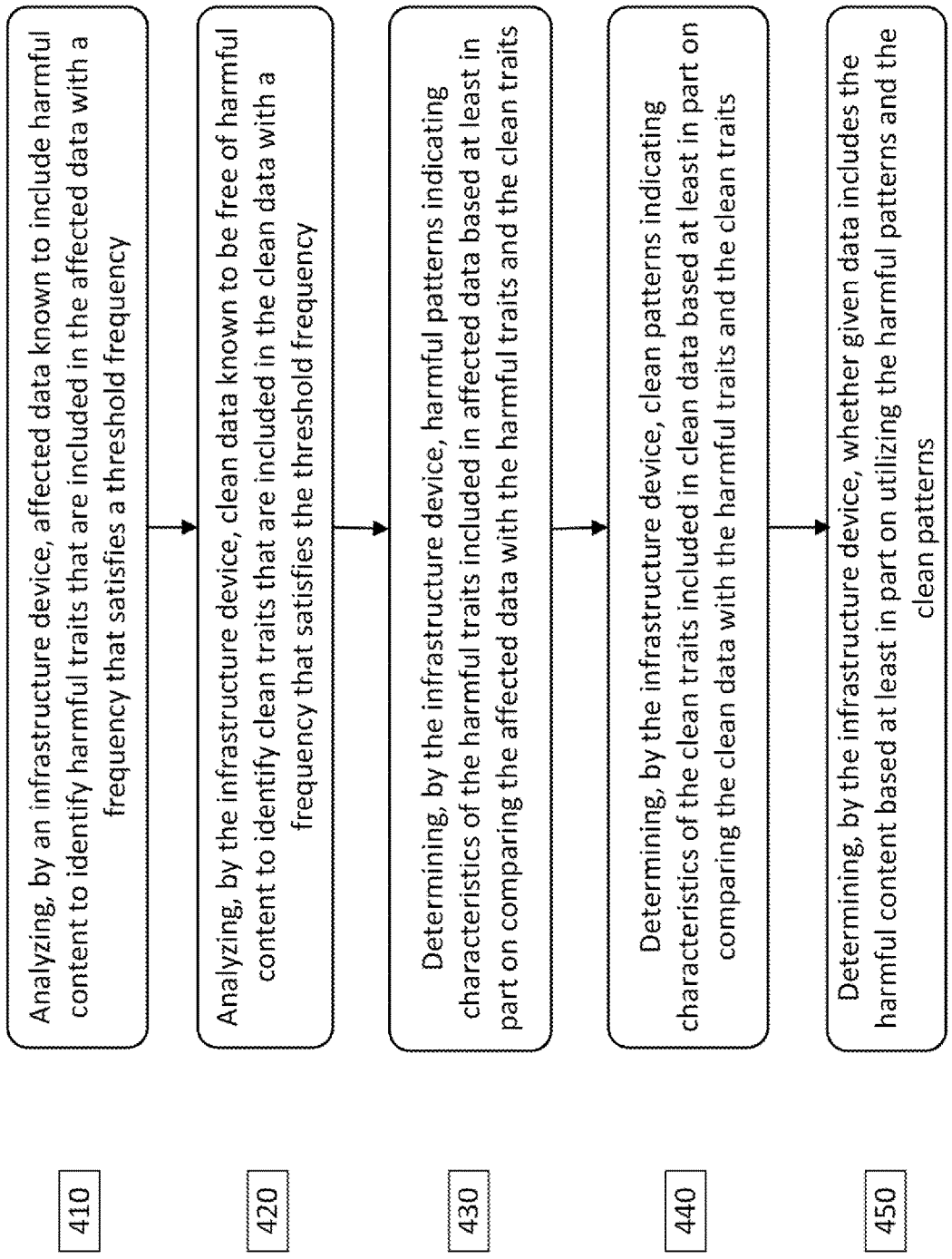

FIG. 4 is an illustration of an example process associated with optimized analysis for detecting harmful content, according to various aspects of the present disclosure.

Figure 5:
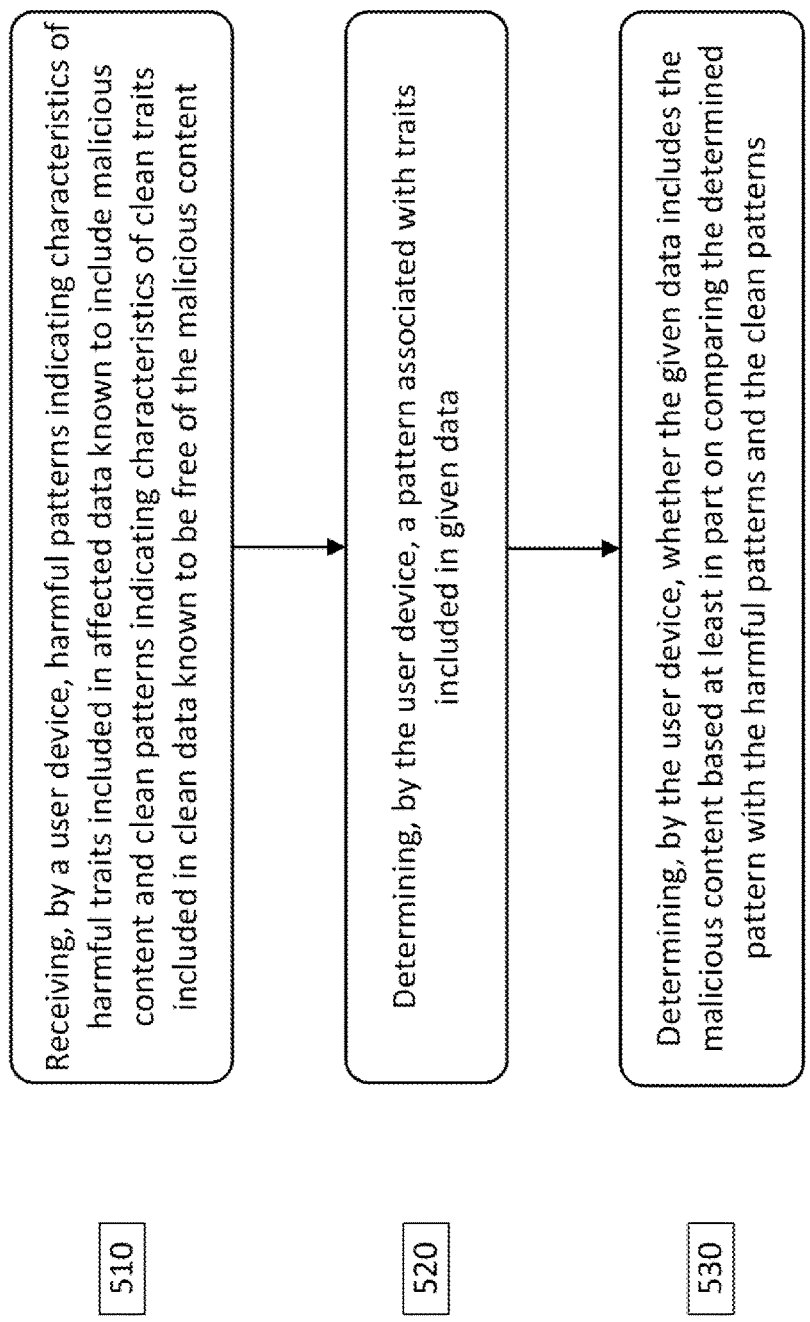

FIG. 5 is an illustration of an example process associated with optimized analysis for detecting harmful content, according to various aspects of the present disclosure.

Figure 6:
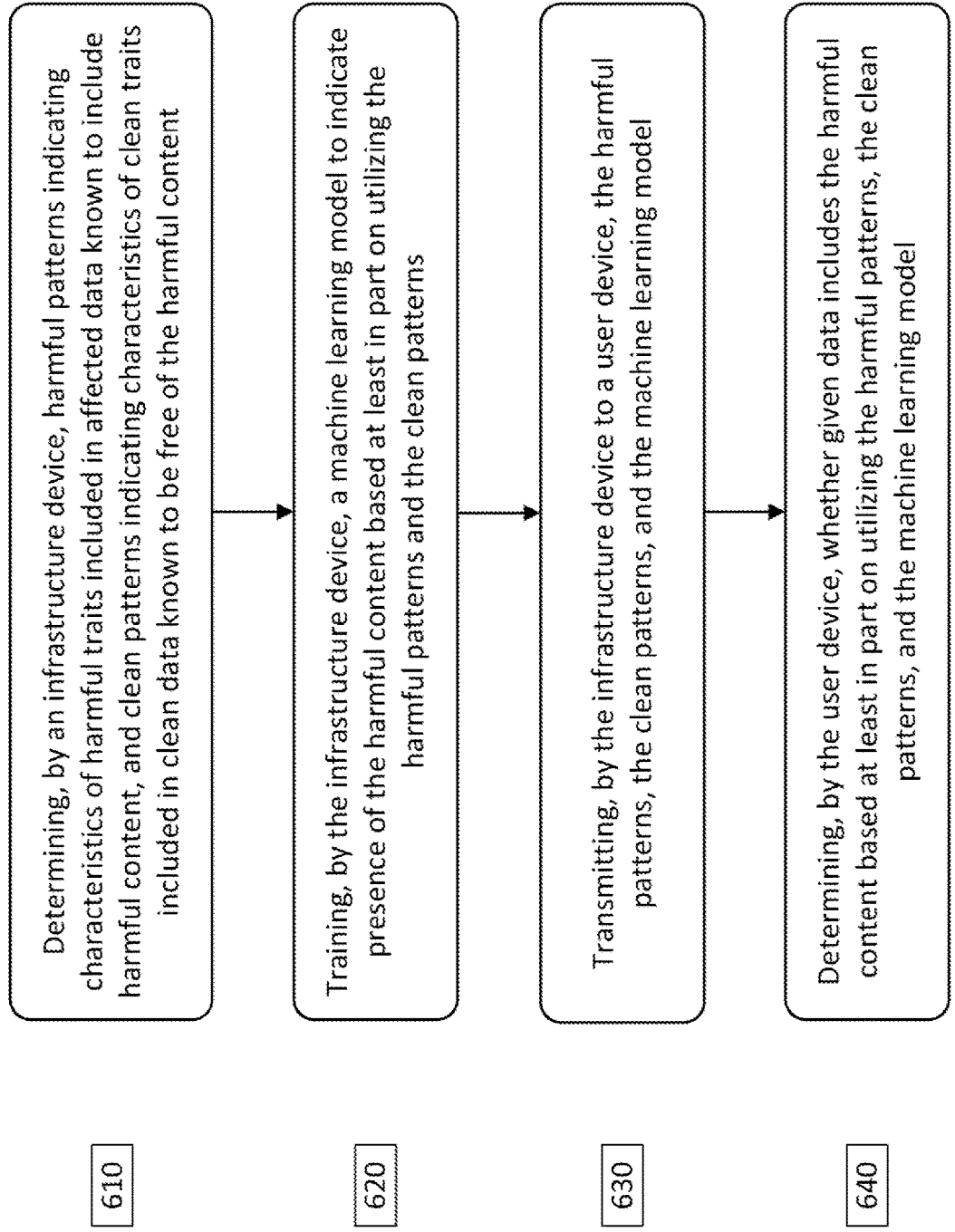

FIG. 6 is an illustration of an example process associated with optimized analysis for detecting harmful content, according to various aspects of the present disclosure.

Figure 7:
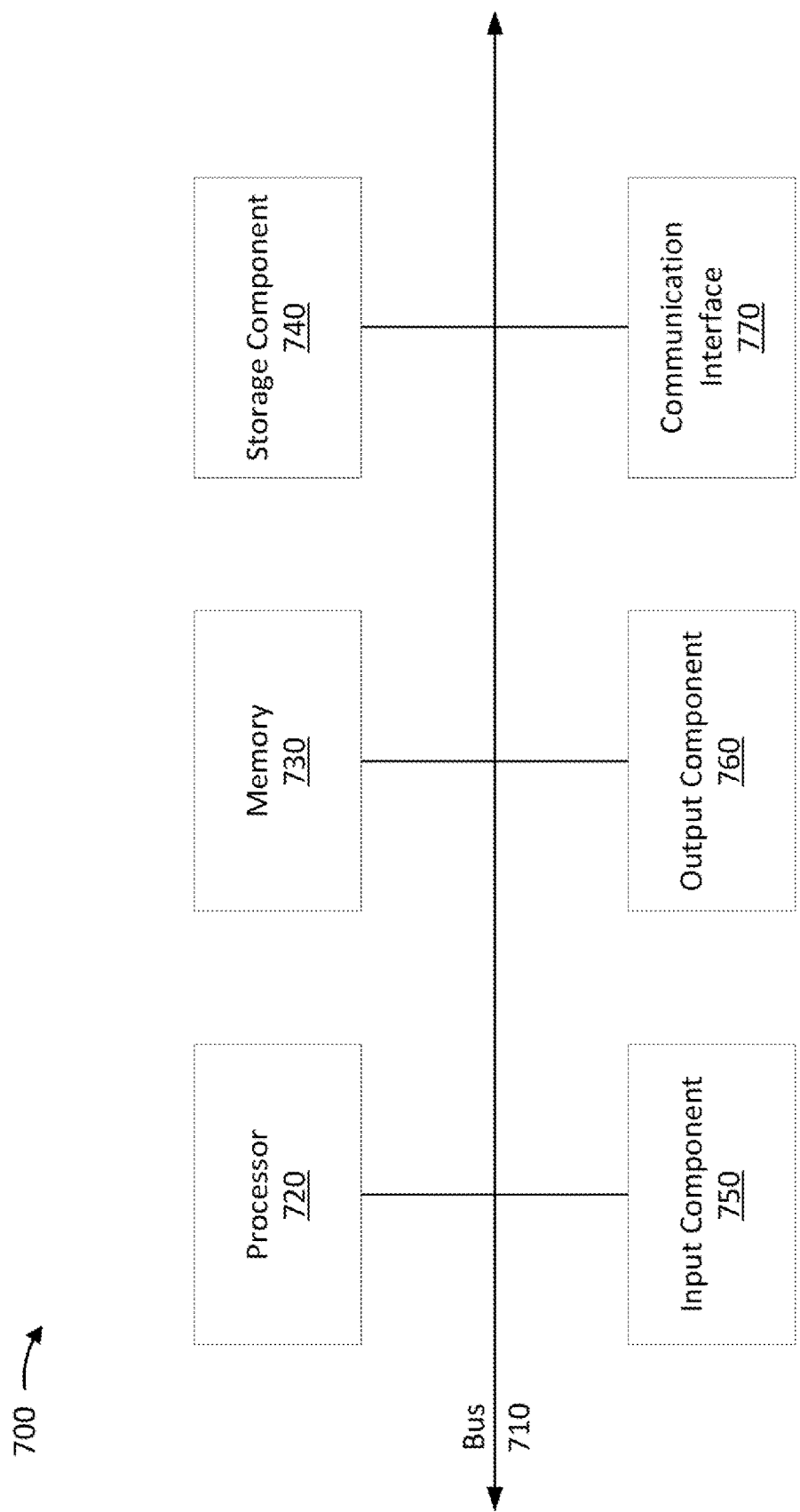

FIG. 7 is an illustration of example devices associated with optimized analysis for detecting harmful content, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example 100 associated with optimized analysis for detecting harmful content, according to various aspects of the present disclosure. Example 100 shows an architectural depiction of included components. In some aspects, the components may include one or more user devices 102 in communication with a cyber security service provider (CSP) control infrastructure 104 for purposes of obtaining cyber security services. The one or more user devices 102 and the CSP control infrastructure 104 may communicate over a network 106. The CSP control infrastructure 104 may include a security device 108, a processing unit 110, and a security database 112. The CSP control infrastructure 104 may be owned and operated by a cyber security service provider. The security device 108 may be configured to communicate with the one or more user devices 102 and may be communicatively coupled to the processing unit 110. Additionally, the processing unit 110 may be communicatively coupled to the security database 112, which may be capable of storing data associated with providing the cyber security services.

A user device 102 may include a security application 114 and a processing unit 116. The user device 102 may receive the security application 114 from the security device 108. In an example, a first user device may communicate with the security device 108 to receive a first security application 114 and a second user device may communicate with the security device 108 to receive a second security application 114. In some aspects, the security device 108 may configure the security applications 114 to enable optimized analysis for detecting harmful content, as discussed herein. The first user device 102 may utilize the first security application 114 and the second user device 102 may utilize the second security application 114 to communicate (e.g., transmit and/or receive data) with the security device 108 and/or each other.

The one or more user devices 102 may be physical computing devices capable of hosting applications (e.g., security applications 114, third-party applications, etc.) and of connecting to the network 106. The one or more user devices 102 may include, for example, a laptop, a mobile phone, a tablet computer, a desktop computer, a smart device, a router, or the like. In some aspects, the one or more user devices 102 may include, for example, Internet-of-Things (IoT) devices such as MSP smart home appliances, smart home security systems, autonomous vehicles, smart health monitors, smart factory equipment, wireless inventory trackers, biometric cyber security scanners, or the like. In some aspects, the one or more user devices 102 may include a server computer.

The network 106 may be any wired or wireless digital telecommunication network that permits several nodes to share and access resources. In some aspects, the network 106 may include a combination of one or more of, for example, a local-area network (LAN), a wide-area network (WAN), a campus-area network (CAN), a metropolitan-area network (MAN), a home-area network (HAN), Internet, Intranet, Extranet, and Internetwork.

The processing unit 110 may be a logical unit including a logical component configured to perform complex operations associated with computing, for example, numerical weights related to various factors associated with providing the cyber security services. The processing unit 110 included in the CSP control infrastructure 104 may be configured to configure the security device 108 to provide the cyber security services to the one or more user devices 102.

The CSP control infrastructure 104 may include a combination of hardware and software components that enable provision of cyber security services to the one or more user devices 102. The CSP control infrastructure 104 may interface with the one or more user devices 102 via an application programming interface (API) (not shown), which may include one or more endpoints to a defined request-response message system. In some aspects, the API may be configured to receive, via the network 106, a connection request from the one or more user devices 102 to establish a connection with the CSP control infrastructure 104 for purposes of obtaining the cyber security services. The connection request may include a request to obtain and install security applications 114 and/or to receive the cyber security services.

The API may further be configured to handle the connection request(s) by mediating the authentication request. For instance, the API may receive from the user device 102 credentials including, for example, a unique combination of a user ID and password for purposes of authenticating the user device 102. In another example, the credentials may include a unique validation code known to an authentic user. The API may provide the received credentials to the processing unit 110 for verification. The processing unit 110 may communicate with the security database 112 to authenticate the user device 102.

The security database 112 may include a structured repository of valid credentials belonging to authentic users. In one example, the structured repository may include one or more tables containing valid unique combinations of user IDs and passwords belonging to authentic users. In another example, the structured repository may include one or more tables containing valid unique validation codes associated with authentic users. The cyber security service provider may add or delete such valid unique combinations of user IDs and passwords from the structured repository at any time. Based at least in part on receiving the credentials from the API, the processor 110 may verify the received credentials by matching the received credentials with the valid credentials stored in the structured repository. In some aspects, the security database 112 and the processing unit 110 may authenticate the user device 102 when the received credentials match at least one of the valid credentials. In this case, the cyber security service provider may provide better security services to the user device 102. When the received credentials fail to match at least one of the valid credentials, the security database 112 and the processing unit 110 may fail to authenticate the user device 102. In this case, the cyber security service provider may decline to provide cyber security services to the user device 102. Additionally, as discussed below in further detail, the security database 112 may store data associated with providing the cyber security services.

When the user device 102 is authenticated, the user device 102 may initiate a connection with the CSP control infrastructure 104 for obtaining the cyber security services. The processing unit 110 may utilize the security device 108 to transmit information associated with the cyber security services to the user device 102.

One or more components (e.g., security device 108, processing unit 110, and/or security database 112, security application 114, processing unit 116) included in the CSP control infrastructure 104 and/or included in the user device 102, as shown in FIG. 1, may further be associated with a controller/processor, a memory, a communication interface, or a combination thereof (e.g., FIG. 7). For instance, the one or more components may include or may be included in a controller/processor, a memory, or a combination thereof. In some aspects, the one or more components included in the CSP control infrastructure 104 may be separate and distinct from each other. Alternatively, in some aspects, the one or more of the components included in the CSP control infrastructure 104 may be combined with one or more of the other components. In some aspects, the one or more of the components included in the CSP control infrastructure 104 and/or the user device 102 may be local with respect to each other. Alternatively, in some aspects, one or more of the components included in the CSP control infrastructure 104 and/or the user device 102 may be located remotely with respect to one or more of other components included in the CSP control infrastructure 104 and/or the user device 102. Additionally, or alternatively, one or more components of the components included in the CSP control infrastructure 104 and/or the user device 102 may be implemented at least in part as software stored in a memory for execution by a processor. For example, a component (or a portion of a component) may be implemented as instructions or code stored in a non-transitory computer-readable medium and executable by a controller or a processor to perform the functions or operations of the component. Additionally, the one or more components may be configured to perform one or more functions described as being performed by another set of components shown in FIG. 1.

As indicated above, FIG. 1 is provided as an example. Other examples may differ from what is described with regard to FIG. 1.

A user device may wish to detect presence of harmful content (e.g., malware) in data. In an example, a user device may want to detect whether the data includes harmful content. Such data may include, for example, stored and/or downloaded (i) software code, (ii) document or file, (iii) content (photo and/or audio-video), and/or (iv) communications including an email, a message, or the like.

To detect presence of the harmful content, the user device may utilize signature-based detection. For instance, during downloading of the data and/or when the data is stored, the user device may match a sequence of bits, known to be associated with harmful content, with the data. When the user device determines that the sequence of bits is included within the data (e.g., the sequence of bits matches bits associated with the data), the user device may determine that the data includes harmful content. Alternatively, when the user device determines that the sequence of bits is not included within the data (e.g., the sequence of bits fails to match bits associated with the data), the user device may determine that the data fails to include the harmful content.

In some cases, the user device may fail to accurately determine whether the data includes the harmful content. In an example, the harmful content may be configured to obfuscate itself during downloading of the data and/or when the data is stored. For instance, the harmful content may scramble associated bits to avoid detection during the signature-based detection and may descramble the associated bits during execution.

Such execution of the harmful content may enable unauthorized access to the user device. The harmful content may be designed to disrupt and/or damage operation of the user device. In an example, the harmful content may embed itself within an operating system of the user device, and may execute an unauthorized transmission of private information stored in an memory associated with the user device. In another example, the harmful content may execute an unauthorized deletion of data stored in the memory. The harmful content may also cause other hindrances by adversely affecting the operating system of the user device such that the operating system may run slower and/or associated circuitry may emit excessive heat and/or noise, thereby causing damage to the user device.

In such cases, the user device may expend various user device resources (e.g., processing resources, memory resources, power consumption resources, battery life, or the like) in efforts to mitigate effects of the private information becoming compromised and the hindrances caused by the harmful content.

Various aspects of systems and techniques discussed in the present disclosure enable optimized analysis for detecting harmful content (may also be referred to as malicious content). In some aspects, as shown in FIG. 1, a CSP control infrastructure may configure a security device to enable optimized analysis for detecting presence of harmful content (e.g., malware, spam, etc.) in data, as discussed herein. In some aspects, during a reference period, the security device may determine pattern information by identifying harmful patterns of traits known to be more likely to be associated with harmful content and/or by identifying clean patterns of traits known to be more likely to be associated with clean content (e.g., content free of harmful content). In some aspects, traits may include, for example, functions associated with software code. In some aspects, traits may include, for example, strings associated with communications (e.g., emails, messages, text, etc.). The security device may label the harmful patterns and label the clean patterns. Further, based at least in part on labeling the harmful patterns and the clean patterns, the security device may train a machine learning (ML) model to identify the harmful patterns and the clean patterns. During an operation period, the security device may make available the ML model to a user device, which may utilize the ML model to determine whether the given data includes harmful content. In an example, the user device may determine that the given data likely includes harmful content based at least in part on detecting presence of a harmful pattern in the given data. In another example, the user device may determine that the given data likely fails to include a harmful content based at least in part on (i) failing to detect presence of a harmful pattern in the given data and/or (ii) detecting presence of a clean pattern in the given data. In this way, by utilizing the harmful patterns and the clean patterns (e.g., pattern-based detection) instead of mere signature-based detection, which may yield inconclusive results, the security device may enable the user device to accurately determine whether the data includes the harmful content, even when bits associated with the given data may be obfuscated during download or storage. As a result, the security device may prevent unauthorized access to the user device. In other words, the security device may reduce a possibility of private information becoming compromised and/or other hindrances. Additionally, the security device may enable efficient utilization of user device resources (e.g., processing resources, memory resources, power consumption resources, battery life, or the like) for suitable tasks associated with providing the cyber security services.

In some aspects, a processor (e.g., processing unit 110, processor 720, etc.) may analyze affected data known to include harmful content to identify harmful traits that are included in the affected data with a frequency that satisfies a threshold frequency; analyze clean data known to be free of harmful content to identify clean traits that are included in the clean data with a frequency that satisfies the threshold frequency; determine harmful patterns indicating characteristics of the harmful traits included in affected data based at least in part on comparing the affected data with the harmful traits and the clean traits; determine clean patterns indicating characteristics of the clean traits included in clean data based at least in part on comparing the clean data with the harmful traits and the clean traits; and determine whether given data includes the harmful content based at least in part on utilizing the harmful patterns and the clean patterns.

FIG. 2 is an illustration of an example flow 200 associated with optimized analysis for detecting harmful content, according to various aspects of the present disclosure. The example flow 200 may include a security device (e.g., security device 108) in communication with the user device (e.g., user device 102). In some aspects, the security device and the user device may communicate with each other over a network (e.g., network 106). The user device may be associated with the security device for purposes of, for example, obtaining cyber security services. To provide the cyber security services, a CSP control infrastructure (e.g., CSP control infrastructure 104) may configure the security device to configure and provide a security application to be utilized by the user device. The security device may configure the security application to enable the user device to perform the optimized analysis for detecting harmful content, as discussed herein.

Further, to provide the cyber security services, as shown by reference numeral 210, the CSP control infrastructure may configure the security device to determine pattern information during a reference period and to store the pattern information in, for example, an associated security database (e.g., security database 112). The pattern information may include harmful patterns of traits known to be more likely to be associated with harmful content and/or clean patterns of traits known to be more likely to be associated with clean content (e.g., content free of harmful content). In some aspects, traits may include, for example, functions associated with software code. Functions may include, for example, blocks of code lines associated with performing respective tasks. In some aspects, traits may include, for example, strings of alphanumeric characters (e.g., words and/or phrases) associated with communications (e.g., emails, messages, text, etc.).

To determine the harmful patterns, the security device may analyze data known to include the harmful content. Such data may be referred to as known affected data. In an example, the security device may analyze affected software codes known to include malware. Further, to determine the clean patterns, the security device may analyze data known to be free of the harmful content. Such data may be referred to as known clean data. In an example, the security device may analyze clean software codes that fail to include malware (e.g., clean software code that does not include malware or is free of malware).

In some aspects, the security device may perform a frequency-based analysis. In an example, based at least in part on analyzing the known affected data and the known clean data, the security device may determine harmful traits that are associated with the harmful content and appear in the known affected data with a frequency that satisfies (e.g., is equal to or higher than) a threshold frequency (e.g., are more likely to appear in the known affected data), clean traits that are associated with clean content and appear in the known clean data with the frequency that satisfies (e.g., is equal to or higher than) the threshold frequency (e.g., are more likely to appear in the known clean data), and hybrid traits that are equally likely to appear in the known affected data and in the known clean data. In some aspects, hybrid traits may include trait that do not satisfy the threshold frequency for clean traits or the threshold frequency for harmful traits. The security device may be configured to determine a value (e.g., 50%, 75%, 80%, 90%, etc.) associated with the threshold frequency based at least in part on a sensitivity associated with identifying the harmful content.

In an example, while analyzing the known affected software codes and the known clean software codes, the security device may determine harmful functions that are more likely to appear in the known affected software codes, clean functions that are more likely to appear in the known clean software codes, and hybrid functions that are equally likely to appear in the known affected software codes and in the known clean software codes.

To identify the harmful functions, the clean functions, and the hybrid functions, the security device may identify a structure associated with a software code being analyzed. The structure may include a call tree of functions that are arranged to call each other for performing specific tasks. For instance, the call tree may include a first function that, during execution to perform a first task associated with the first function, may call a second function to cause performance of a second task associated with the second function, which during execution to perform the second task, may call a third function to cause performance of a third task associated with the third function, and so on. In some aspects, to identify the functions, the security device may follow the structure and execute the functions in the software code being analyzed.

In some aspects, the harmful functions that are more likely to appear in the known affected software codes may be associated with performing tasks associated with one or more of modifying a startup registry, modifying a boot partition, editing other functions by adding and/or deleting code lines, privilege escalation, accessing and/or editing protected operating system files, manipulating information associated with access tokens, disabling protection mechanisms designed to enable authorized operation of the operating system, sniffing and/or spoofing network packets, sniffing low-level input devices, and/or accessing device firmware.

In some aspects, the clean functions that are more likely to appear in the known clean software codes may be associated with performing tasks associated with one or more of editing a graphical user interface, accessing a graphical/treaty hardware accelerator, rendering (e.g., playing) audio and/or video files, processing of messages that are received and/or to be transmitted, controlling input-output operations of a console, printing, monitoring operations of the operating system, copying optical media information (e.g., burning a compact disc, etc.), processes associated with machine learning functionality, and/or processes associated with authentication of peer devices.

In some aspects, the hybrid functions that are equally likely to appear in the known affected software codes and in the known clean software codes may be associated with performing tasks associated with one or more of downloading data over the Internet utilizing various protocols (e.g., HTTP, FTP, etc.), managing operations often associated memory, accessing a clipboard utilized for managing, for example, information to be copied, cryptography operations, operations associated with obtaining a domain name service (e.g., domain name resolution), management of communication threads, manipulation of alphanumeric strings, interpretation of a script, and/or accessing information associated with the registry.

Based at least in part on identifying the harmful functions, the clean functions, and the hybrid functions, the security device may include the harmful functions and the clean functions in a memory. In some aspects, the security device may intermingle the harmful functions and the clean functions in the memory. The security device may discard the hybrid functions to reduce an amount of functions to be utilized for identifying harmful content, and thereby improve efficiency associated with identifying the harmful content. The efficiency is improved based at least in part on realizing a limited utility of the hybrid functions in identifying the harmful content because the hybrid functions are equally likely to appear in the known affected software codes and in the known clean software codes.

Further, the security device may perform a pattern-based analysis. In some aspects, the security device may again analyze the known affected software codes and the known clean software codes in view of the intermingled functions (e.g., the intermingled harmful functions and clean functions in the memory) to determine patterns in which the intermingled functions appear in the known affected software code and in the known clean software codes. For instance, the security device may compare the known affected software codes with the intermingled functions to determine respective harmful patterns in which the intermingled functions appear in each of the known affected software codes. Similarly, the security device may compare the known clean software codes with the intermingled functions to determine respective clean patterns in which the intermingled functions appear in each of the known clean software codes.

Based at least in part on performing the pattern-based analysis, the security device may determine a plurality of harmful patterns that indicate characteristics of particular functions (e.g., harmful and/or clean). In an example, the security device may determine a first harmful pattern to indicate a combination of particular harmful functions and/or particular clean functions that appear in a first known affected software code. In another example, the security device may determine a second harmful pattern to indicate a particular arrangement of harmful and/or clean functions, as arranged in a second known affected software code. For instance, the second harmful pattern may indicate that a particular first function (e.g., harmful or clean) is arranged to call a particular second function (e.g., harmful or clean), which in turn is arranged to call a particular third function (e.g., harmful or clean), and so on. In yet another example, the security device may determine a third harmful pattern to indicate a frequency (e.g., a number of times) with which a particular function (e.g., harmful or clean) is arranged to call another particular function (e.g., harmful or clean). In yet another example, the security device may determine a fourth harmful pattern to indicate a frequency (e.g., a number of times) with which a particular function is executed. In some aspects, a harmful pattern may include a combination of harmful patterns (e.g., first harmful pattern and/or second harmful pattern and/or third harmful pattern and/or fourth harmful pattern, etc.).

Similarly, the security device may determine a plurality of clean patterns that indicate characteristics of particular functions (e.g., harmful and/or clean). In an example, the security device may determine a first clean pattern to indicate a combination of particular harmful functions and/or clean functions that appear in a first known clean software code. In another example, the security device may determine a second clean pattern to indicate a particular combination of clean functions, as arranged in a second known clean software code. For instance, the second clean pattern may indicate that a particular first function is arranged to call a particular second function, which in turn is arranged to call a particular third function, and so on. In yet another example, the security device may determine a third clean pattern to indicate a frequency (e.g., a number of times) with which a particular function is arranged to call another particular function. In yet another example, the security device may determine a fourth clean pattern to indicate a frequency (e.g., a number of times) with which a particular function is executed. In some aspects, a clean pattern may include a combination of clean patterns (e.g., first clean pattern and/or second clean pattern and/or third clean pattern and/or fourth clean pattern, etc.). The security device may determine the pattern information to include the plurality of harmful patterns and the plurality of clean patterns.

The security device may also determine pattern information related to communications (e.g., text data). For instance, while performing the frequency-based analysis to analyze known affected communications and known clean communications, the security device may determine harmful strings (e.g., words and/or phrases including alphanumeric characters) that are more likely to appear in the known affected communications, clean strings that are more likely to appear in the known clean communications, and/or hybrid strings that are equally likely to appear in the known affected communications and in the known clean communications. To identify the harmful strings, the clean strings, and/or the hybrid strings, the security device may identify words and/or phrases included in a communication being analyzed.

Based at least in part on identifying the harmful strings, the clean strings, and/or the hybrid strings, the security device may include the harmful strings and the clean strings in a memory. In some aspects, the security device may intermingle the harmful strings and the clean strings in the memory. The security device may discard the hybrid strings to reduce an amount of strings to be utilized for identifying harmful content, and thereby improve efficiency associated with identifying the harmful content. The efficiency is improved based at least in part on realizing a limited utility of the hybrid strings in identifying the harmful content because the hybrid strings are equally likely to appear in the known affected communications and in the known clean communications.

Further, the security device may perform a pattern-based analysis. In some aspects, the security device may again analyze the known affected communications and the known clean communications in view of the intermingled strings (e.g., the intermingled harmful strings and clean strings in the memory) to determine patterns in which the intermingled strings appear in the known affected communication and in the known clean communications. For instance, the security device may compare the known affected communications with the intermingled strings to determine respective harmful patterns in which the intermingled strings appear in each of the known affected communications. Similarly, the security device may compare the known clean communications with the intermingled strings to determine respective clean patterns in which the intermingled strings appear in each of the known clean communications.

Based at least in part on performing the pattern-based analysis, the security device may determine a plurality of harmful patterns that indicate characteristics of particular strings (harmful and/or clean). In an example, the security device may determine a first harmful pattern to indicate a combination of particular harmful strings and/or clean strings that appear in a first known affected communication. In another example, the security device may determine a second harmful pattern to indicate a particular order of harmful strings, as arranged in a second known affected communication. For instance, the second harmful pattern may indicate that a particular first string is arranged to appear in an order (e.g., before, after, together, etc.) with respect to a particular second string, which in turn is arranged to appear in an order with respect to a particular third string, and so on. In yet another example, the security device may determine a third harmful pattern to indicate a frequency (e.g., number of times) a particular string appears in the communication. In some aspects, a harmful pattern may include a combination of harmful patterns (e.g., first harmful pattern and/or second harmful pattern and/or third harmful pattern, etc.).

Similarly, the security device may determine a plurality of clean patterns. In an example, the security device may determine a first clean pattern to indicate a combination of particular harmful strings and/or clean strings that appear in a first known clean communication. In another example, the security device may determine a second clean pattern to indicate a particular combination of clean strings, as arranged in a second known clean communication. For instance, the second harmful pattern may indicate that a particular first string is arranged to appear in an order (e.g., before, after, together, etc.) with respect to a particular second function, which in turn is arranged to appear in an order with respect to a particular third function, and so on. In yet another example, the security device may determine a third clean pattern to indicate a frequency (e.g., a number of times) with which a particular string is arranged in a given order. In yet another example, the security device may determine a fourth clean pattern to indicate a frequency (e.g., a number of times) with which a particular string appears in the communication. In some aspects, a clean pattern may include a combination of clean patterns (e.g., first clean pattern and/or second clean pattern and/or third clean pattern and/or fourth clean pattern, etc.). The security device may determine the pattern information to include the plurality of harmful patterns and the plurality of clean patterns.

Based at least in part on determining the pattern information, as shown by reference numeral 220, the security device may utilize the pattern information as input training data to train a machine learning model to determine whether a given data includes harmful content. In some aspects, as shown in example 300 of FIG. 3, a processor (e.g., processing unit 110) associated with the security device may include and/or utilize a self-learning machine learning model (ML model) 310 in connection with performing an optimized analysis for detecting harmful content. In some aspects, the ML model 310 may include a supervised learning model. In some aspects, the ML model 310 may include an unsupervised learning model. In some aspects, the ML model 310 may include a reinforced learning model. The processor may utilize the ML model 310 to automatically and with improved accuracy optimize the analysis for detecting harmful content.

As shown by reference numeral 320, the ML model 310 may obtain input training data including the pattern information, metadata, previous metadata associated with information received during at least one previous instance of optimizing the analysis for detecting harmful content, and/or update data associated with an output provided by the ML model 310 during at least one previous instance of optimizing the analysis for detecting harmful content. In some aspects, the processor may store the training data in, and the ML model 310 may obtain the above training data from, for example, one or more databases described elsewhere herein (e.g., security database 112, memory 730). In some aspects, the previous metadata may include historical metadata associated with the at least one previous instance of optimizing the analysis for detecting harmful content. In some aspects, the update data may include historical output data associated with at least one previous instance of optimizing the analysis for detecting harmful content. In some aspects, the ML model 310 may obtain the training data that is input via an interface associated with the security device.

As shown by reference number 330, the ML model 310 may process the input data using a machine learning algorithm (ML algorithm). Such input data may include, for example, traits identified by the security device in the given data. In some aspects, the ML model 310 may utilize the ML algorithm to evaluate the input data along with the training data to learn trends and patterns associated with optimizing the analysis for detecting harmful content. In some aspects, the ML algorithm may evaluate and take into account feedback information (e.g., success rate) associated with previously optimizing the analysis for detecting harmful content. The ML algorithm may provide output data to the processor based at least in part on the evaluated training data and the learned trends and patterns. In some aspects, the output data may indicate a value associated with the likelihood that the analysis for detecting harmful content was optimized successfully, thereby assisting the processor in more accurately detecting harmful content.

As shown by reference number 340, at an end of an instance of processing the input data to detect the harmful content, the ML model 310 may receive update data including at least the training data and/or the output data. In some aspects, the update data may be included in the previous metadata stored in the one or more memories (e.g., security database 112, memory 730) to be used as input training data for future iterations of processing the input training data to optimize the analysis for detecting harmful content. In some aspects, the ML model 310 may evaluate the update data to learn various aspects such as accuracy, consistency, reliability, efficiency, and/or the like of the output data in enabling the processor to more accurately optimize the analysis for detecting harmful content. In this way, the processor may utilize the ML model 310 to apply a rigorous and automated process to optimize the analysis for detecting harmful content. In some aspects, the ML model 310 may enable the security device to more accurately determine whether given data includes harmful content.

Based at least in part on training the ML model to more accurately optimize the analysis for detecting harmful content, as shown by reference numeral 230, the security device may transmit at least a part of the database including the intermingled functions and/or strings and the ML model to the user device.

As shown by reference numeral 240, the user device may store at least the part of the database including the intermingled functions and/or strings in a memory associated with the user device. Further, the user device may utilize the security application and/or the ML model to determine whether the given data includes affected data (e.g., data including harmful content) or whether the given data includes clean data (e.g., data that fails to include harmful content).

In some aspects, the user device may determine the traits (e.g., functions, strings, etc.) included in the given data. In an example, when the given data includes software code, the user device may identify all functions included in the software code. To determine the included functions, the user device may identify a structure associated with the software code. The structure may include a call tree of functions that are arranged to call each other for performing specific tasks. For instance, the call tree may include a first function that, during execution to perform a first task associated with the first function, calls a second function to cause performance of a second task associated with the second function, which during execution to perform the second task, calls a third function to cause performance of a third task associated with the third function, and so on. In some aspects, the user device may follow the structure and execute the functions in the software code being analyzed to identify the functions.

Based at least in part on identifying the functions included in the software code, the user device may compare the identified functions with the intermingled functions included in the database provided by the security device. Based at least in part on the comparison, the user device may filter the identified functions. In an example, when the user device determines that an identified function matches a function included in the intermingled functions, the user device may store the identified function for further analysis. Alternatively, when the user device determines that an identified function fails to match a function included in the intermingled functions, the user device may discard the identified function to improve efficiency, as discussed elsewhere herein.

Further, the user device may perform a pattern-based analysis on the stored identified functions. In some aspects, the user device may determine a plurality of identified patterns associated with arrangement of the identified functions in the given data. In an example, the user device may determine a first identified pattern to indicate a combination of particular functions as appearing in the given data. In another example, the security device may determine a second identified pattern to indicate a particular arrangement of functions, as arranged in the given data. For instance, the second identified pattern may indicate that a particular first function is arranged to call a particular second function, which in turn is arranged to call a particular third function, and so on. In yet another example, the user device may determine a third identified pattern to indicate a frequency (e.g., a number of times) with which a particular function is arranged to call another particular function. In yet another example, the user device may determine a third identified pattern to indicate a frequency (e.g., a number of times) with which a particular function is executed. In some aspects, an identified pattern may include a combination of identified patterns (e.g., first identified pattern and/or second identified pattern and/or third identified pattern and/or fourth identified pattern, etc.).

When the given data includes a communication, the user device may identify all strings included in the communication. To determine the included strings, the user device may identify words and/or phrases included in the communication.

Based at least in part on identifying the strings included in the communication, the user device may compare the identified strings with the intermingled strings included in the database provided by the security device. Based at least in part on the comparison, the user device may filter the identified strings. In an example, when the user device determines that an identified string matches a string included in the intermingled strings, the user device may store the identified string for further analysis. Alternatively, when the user device determines that an identified string fails to match a string included in the intermingled strings, the user device may discard the identified string to improve efficiency, as discussed elsewhere herein.

Further, the user device may perform a pattern-based analysis on the stored identified strings. In some aspects, the user device may determine a plurality of identified patterns associated with arrangement of the identified strings in the given data. In an example, the user device may determine a first identified pattern to indicate a combination of particular strings as appearing in the given data. In another example, the user device may determine a second identified pattern to indicate a particular order of strings, as ordered in the given data. For instance, the second identified pattern may indicate that a particular first string is arranged to appear in an order (e.g., before, after, together, etc.) with respect to a particular second string, which in turn is arranged to appear in an order with respect to a particular third string, and so on. In yet another example, the security device may determine a third clean pattern to indicate a frequency (e.g., a number of times) with which a particular string is arranged in a given order. In yet another example, the security device may determine a fourth clean pattern to indicate a frequency (e.g., a number of times) with which a particular string appears in the given data. In some aspects, a clean pattern may include a combination of clean patterns (e.g., first clean pattern and/or second clean pattern and/or third clean pattern and/or fourth clean pattern, etc.).

Based at least in part on performing the pattern-based analysis, the user device may provide the plurality of identified patterns as input data into the ML model received from the security device. To provide the plurality of identified patterns, the user device may provide metadata (e.g., type of file) and/or information associated with a frequency of occurrence of the patterns (e.g., code traits). In some aspects, the user device may utilize the security application (e.g., security application 114) and/or a processor (e.g., processing unit 116) associated with the user device to execute the ML model. The ML model may provide output data based at least in part on the evaluated training data and the learned trends and patterns, as discussed elsewhere herein. In some aspects, the output data may indicate a value associated with the likelihood that the given data includes affected data or that the given data includes clean data.

In some aspects, as shown by reference numeral 250, the user device may transmit to the security device feedback information including the utilized training data, the output data, and other information associated with execution of the ML model by the user device. As shown by reference numeral 260, the security device may utilize the received feedback information to update the security database and/or the ML model, and, as shown by reference numeral 270, may transmit the updated ML model to the user device.

In this way, by utilizing the harmful patterns and the clean patterns instead of mere signature-based detection, the security device may enable the user device to accurately determine whether the data includes the harmful content. As a result, the security device may prevent unauthorized access to the user device. In other words, the security device may reduce a possibility of private information becoming compromised and/or other hindrances. Additionally, the security device may enable efficient utilization of infrastructure resources (e.g., processing resources, memory resources, power consumption resources, battery life, or the like) and/or user device resources (e.g., processing resources, memory resources, power consumption resources, battery life, or the like) for suitable tasks associated with providing the cyber security services.

FIG. 4 is an illustration of an example process 400 associated with optimized analysis for detecting harmful content, according to various aspects of the present disclosure. In some aspects, the process 400 may be performed by a memory and/or processor (e.g., processing unit 110, processor 720) associated with an infrastructure device (e.g., security device 108). As shown by reference numeral 410, process 400 may include analyzing, by an infrastructure device, affected data known to include harmful content to identify harmful traits that are included in the affected data with a frequency that satisfies a threshold frequency. For instance, the infrastructure device may utilize the associated memory and/or processor to analyze affected data known to include harmful content to identify harmful traits that are included in the affected data with a frequency that satisfies a threshold frequency, as discussed elsewhere herein.

As shown by reference numeral 420, process 400 may include analyzing, by the infrastructure device, clean data known to be free of harmful content to identify clean traits that are included in the clean data with a frequency that satisfies the threshold frequency. For instance, the infrastructure device may utilize the associated memory and/or processor to analyze clean data known to be free of harmful content to identify clean traits that are included in the clean data with a frequency that satisfies the threshold frequency, as discussed elsewhere herein.

As shown by reference numeral 430, process 400 may include determining, by the infrastructure device, harmful patterns indicating characteristics of the harmful traits included in affected data based at least in part on comparing the affected data with the harmful traits and the clean traits. For instance, the infrastructure device may utilize the associated memory and/or processor to determine harmful patterns indicating characteristics of the harmful traits included in affected data based at least in part on comparing the affected data with the harmful traits and the clean traits, as discussed elsewhere herein.

As shown by reference numeral 440, process 400 may include determining, by the infrastructure device, clean patterns indicating characteristics of the clean traits included in clean data based at least in part on comparing the clean data with the harmful traits and the clean traits. For instance, the infrastructure device may utilize the memory and/or processor to determine clean patterns indicating characteristics of the clean traits included in clean data based at least in part on comparing the clean data with the harmful traits and the clean traits, as discussed elsewhere herein.

As shown by reference numeral 450, process 400 may include determining, by the infrastructure device, whether given data includes the harmful content based at least in part on utilizing the harmful patterns and the clean patterns. For instance, the infrastructure device may utilize the memory and/or processor to determine whether given data includes the harmful content based at least in part on utilizing the harmful patterns and the clean patterns, as discussed elsewhere herein.

Process 400 may include additional aspects, such as any single aspect or any combination of aspects described below and/or in connection with one or more other processes described elsewhere herein.

In a first aspect, in process 400, determining whether the given data includes the harmful content comprises identifying traits included in the given data and utilizing a machine learning model to compare the identified traits with the harmful patterns and the clean patterns.

In a second aspect, alone or in combination with the first aspect, in process 400, determining the harmful patterns includes determining a harmful pattern that indicates a particular combination of harmful traits included in the affected data.

In a third aspect, alone or in combination with the first through second aspects, in process 400, determining the harmful patterns includes determining a harmful pattern that indicates a number of times a particular harmful trait is included in the affected data.

In a fourth aspect, alone or in combination with the first through third aspects, in process 400, determining the harmful patterns includes determining a harmful pattern that indicates a particular arrangement of one or more harmful traits included in the affected data.

In a fifth aspect, alone or in combination with the first through fourth aspects, in process 400, the harmful traits or the clean traits include functions when the affected data or the clean data includes software code.

In a sixth aspect, alone or in combination with the first through fifth aspects, in process 400, the harmful traits or the clean traits include strings of alphanumeric characters when the affected data or the clean data includes text data.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with optimized analysis for detecting harmful content, according to various aspects of the present disclosure. In some aspects, the process 500 may be performed by one or more memories and/or processors/controllers (e.g., processing unit 116, processor 720) associated with a user device (e.g., user devices 102). As shown by reference numeral 510, process 500 may include receiving, by a user device, harmful patterns indicating characteristics of harmful traits included in affected data known to include malicious content and clean patterns indicating characteristics of clean traits included in clean data known to be free of the malicious content. For instance, the user device may utilize an associated communication interface (e.g., communication interface) with the associated memory and/or processor to receive harmful patterns indicating characteristics of harmful traits included in affected data known to include malicious content and clean patterns indicating characteristics of clean traits included in clean data known to be free of the malicious content, as discussed elsewhere herein.

As shown by reference numeral 520, process 500 may include determining, by the user device, a pattern associated with traits included in given data. For instance, the user device may utilize the associated memory and/or processor to determine a pattern associated with traits included in given data, as discussed elsewhere herein.

As shown by reference numeral 530, process 500 may include determining, by the user device, whether the given data includes the malicious content based at least in part on comparing the determined pattern with the harmful patterns and the clean patterns. For instance, the user device may determine whether the given data includes the malicious content based at least in part on comparing the determined pattern with the harmful patterns and the clean patterns, as discussed elsewhere herein.

Process 500 may include additional aspects, such as any single aspect or any combination of aspects described below and/or in connection with one or more other processes described elsewhere herein.

In a first aspect, in process 500, determining whether the given data includes the malicious content comprises utilizing a machine learning model to compare the determined pattern with the harmful patterns and the clean patterns.

In a second aspect, alone or in combination with the first aspect, in process 500, determining the pattern includes determining the pattern that indicates a particular combination of the traits included in the given data.

In a third aspect, alone or in combination with the first through second aspects, in process 500, determining the pattern includes determining the pattern that indicates a number of times a particular trait is included in the given data.

In a fourth aspect, alone or in combination with the first through third aspects, in process 500, determining the pattern includes determining the pattern that indicates a particular arrangement of one or more traits included in the given data.

In a fifth aspect, alone or in combination with the first through fourth aspects, in process 500, the traits include functions when the given data includes software code.

In a sixth aspect, alone or in combination with the first through fifth aspects, in process 500, the traits include strings of alphanumeric characters when the given data includes text data.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of an example process 600 associated with optimized analysis for detecting harmful content, according to various aspects of the present disclosure. In some aspects, the process 600 may be performed by a memory and/or processor (e.g., processing unit 110, processor 720) associated with an infrastructure device (e.g., security device 108) and/or by one or more memories and/or processors/controllers (e.g., processing unit 116, processor 720) associated with a user device (e.g., user devices 102). As shown by reference numeral 610, process 600 may include determining, by an infrastructure device, harmful patterns indicating characteristics of harmful traits included in affected data known to include harmful content, and clean patterns indicating characteristics of clean traits included in clean data known to be free of the harmful content. For instance, the infrastructure device may utilize the associated memory and/or processor to determine harmful patterns indicating characteristics of harmful traits included in affected data known to include harmful content, and clean patterns indicating characteristics of clean traits included in clean data known to be free of the harmful content, as discussed elsewhere herein.

As shown by reference numeral 620, process 600 may include training, by the infrastructure device, a machine learning model to indicate presence of the harmful content based at least in part on utilizing the harmful patterns and the clean patterns. For instance, the infrastructure device may utilize the associated memory and/or processor to train a machine learning model to indicate presence of the harmful content based at least in part on utilizing the harmful patterns and the clean patterns, as discussed elsewhere herein.

As shown by reference numeral 630, process 600 may include transmitting, by the infrastructure device to a user device, the harmful patterns, the clean patterns, and the machine learning model. For instance, the infrastructure device may utilize an associated communication interface (e.g., communication interface 770) with the associated memory and/or processor to transmit, to a user device, the harmful patterns, the clean patterns, and the machine learning model, as discussed elsewhere herein.

As shown by reference numeral 640, process 600 may include determining, by the user device, whether given data includes the harmful content based at least in part on utilizing the harmful patterns, the clean patterns, and the machine learning model. For instance, the user device may utilize the associated memory and/or processor to determine whether given data includes the harmful content based at least in part on utilizing the harmful patterns, the clean patterns, and the machine learning model, as discussed elsewhere herein.

Process 600 may include additional aspects, such as any single aspect or any combination of aspects described below and/or in connection with one or more other processes described elsewhere herein.

In a first aspect, process 600 may include updating, by the infrastructure device, the machine learning model based at least in part on feedback information received from the user device, the feedback information being associated with the user device determining whether the given data includes the harmful content; and transmitting, by the infrastructure device to the user device, an updated machine learning model.

In a second aspect, alone or in combination with the first aspect, process 600 may include transmitting, by the user device to the infrastructure device, feedback information associated with the user device determining whether the given data includes the harmful content; and receiving, by the user device from the infrastructure device, an updated machine learning model that is updated based at least in part on utilizing the feedback information.

In a third aspect, alone or in combination with the first through second aspects, in process 600, determining the harmful patterns includes determining a harmful pattern that indicates a particular combination of harmful traits included in the affected data.

In a fourth aspect, alone or in combination with the first through third aspects, in process 600, determining the harmful patterns includes determining a harmful pattern that indicates a number of times a particular harmful trait is included in the affected data.

In a fifth aspect, alone or in combination with the first through fourth aspects, in process 600, determining the harmful patterns includes determining a harmful pattern that indicates a particular arrangement of one or more harmful traits included in the affected data.

In a sixth aspect, alone or in combination with the first through fifth aspects, process 600 may include the harmful traits or the clean traits include functions when the affected data or the clean data includes software code, or the harmful traits or the clean traits include strings of alphanumeric characters when the affected data or the clean data includes text data.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of example devices 700 associated with optimized analysis for detecting harmful content, according to various aspects of the present disclosure. In some aspects, the example devices 700 may form part of or implement the systems, servers, environments, infrastructures, components, devices, or the like described elsewhere herein (e.g., CSP control infrastructure, user device, etc.) and may be used to perform example processes described elsewhere herein. The example devices 700 may include a universal bus 710 communicatively coupling a processor 720, a memory 730, a storage component 740, an input component 750, an output component 760, and a communication interface 770.

Bus 710 may include a component that permits communication among multiple components of a device 700. Processor 720 may be implemented in hardware, firmware, and/or a combination of hardware and software. Processor 720 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 720 may include one or more processors capable of being programmed to perform a function. Memory 730 may include a random access memory (RAM), a read only memory (ROM), and/or another type of dynamic or static storage device (e.g., a flash memory, a magnetic memory, and/or an optical memory) that stores information and/or instructions for use by processor 720.

Storage component 740 may store information and/or software related to the operation and use of a device 700. For example, storage component 740 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 750 may include a component that permits a device 700 to receive information, such as via user input (e.g., a touch screen display, a keyboard, a keypad, a mouse, a button, a switch, and/or a microphone). Additionally, or alternatively, input component 750 may include a component for determining location (e.g., a global positioning system (GPS) component) and/or a sensor (e.g., an accelerometer, a gyroscope, an actuator, another type of positional or environmental sensor, and/or the like). Output component 760 may include a component that provides output information from device 700 (via, for example, a display, a speaker, a haptic feedback component, an audio or visual indicator, and/or the like).

Communication interface 770 may include a transceiver-like component (e.g., a transceiver, a separate receiver, a separate transmitter, and/or the like) that enables a device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, and/or the like.

A device 700 may perform one or more processes described elsewhere herein. A device 700 may perform these processes based on processor 720 executing software instructions stored by a non-transitory computer-readable medium, such as memory 730 and/or storage component 740. As used herein, the term "computer-readable medium" may refer to a non-transitory memory device. A memory device may include memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 7 are provided as an example. In practice, a device 700 may include additional components, fewer components, different components, or differently arranged components than those shown in FIG. 7. Additionally, or alternatively, a set of components (e.g., one or more components) of a device 700 may perform one or more functions described as being performed by another set of components of a device 700.

As indicated above, FIG. 7 is provided as an example. Other examples may differ from what is described with regard to FIG. 7.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" or "device" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   determining, by an infrastructure device, a mixed set of harmful traits and clean traits, the harmful traits being associated with affected data known to include harmful content and the clean traits being associated with clean data known to be free of the harmful content;
   determining, by the infrastructure device, harmful patterns indicating characteristics of the harmful traits based at least in part on comparing the affected data with the mixed set of the harmful traits and the clean traits, wherein a harmful pattern, from among the harmful patterns, indicates a particular combination of one or more of the harmful traits;
   transmitting, by the infrastructure device to a user device, the harmful patterns indicating the characteristics of the harmful traits;
   determining, by the user device, a determined pattern based at least in part on traits included in given data;
   determining, by the user device, whether the given data includes the harmful content based at least in part on comparing the determined pattern with the harmful patterns; and
   taking action, by the user device based at least in part on determining that the given data includes the harmful content, to mitigate effects associated with the harmful content.

2. The method of claim 1, wherein a harmful pattern, from among the harmful patterns, indicates a combination of a harmful trait and a clean trait.

3. The method of claim 1, wherein a harmful pattern, from among the harmful patterns, indicates a number of times a particular harmful trait is included in the affected data.

4. The method of claim 1, wherein a harmful pattern, from among the harmful patterns, indicates a particular arrangement of one or more of the harmful traits.

5. The method of claim 1, wherein determining whether the given data includes the harmful content comprises the user device utilizing a machine learning model to compare the determined pattern with the harmful patterns.

6. The method of claim 1, further comprising:
   transmitting, by the infrastructure device to the user device, a machine learning model to utilize for determining whether the given data includes the harmful content.

7. The method of claim 1, further comprising:
   transmitting, by the user device to the infrastructure device, feedback information associated with the user device determining whether the given data includes the harmful content.

8. A system, comprising:
   an infrastructure device; and
   a user device, wherein
   the infrastructure device is configured to:
      determine a mixed set of harmful traits and clean traits, the harmful traits being associated with affected data known to include harmful content and the clean traits being associated with clean data known to be free of the harmful content;
      determine harmful patterns indicating characteristics of the harmful traits based at least in part on comparing the affected data with the mixed set of the harmful traits and the clean traits, wherein a harmful pattern, from among the harmful patterns, indicates a particular combination of one or more of the harmful traits; and transmit, to the user device, the harmful patterns indicating the characteristics of the harmful traits; and the user device is configured to:

determine a determined pattern based at least in part on traits included in given data;

determine whether the given data includes the harmful content based at least in part on comparing the determined pattern with the harmful patterns; and take action, based at least in part on determining that the given data includes the harmful content, to mitigate effects associated with the harmful content.

9. The system of claim 8, wherein a harmful pattern, from among the harmful patterns, indicates a combination of a harmful trait and a clean trait.

10. The system of claim 8, wherein a harmful pattern, from among the harmful patterns, indicates a number of times a particular harmful trait is included in the affected data.

11. The system of claim 8, wherein a harmful pattern, from among the harmful patterns, indicates a particular arrangement of one or more of the harmful traits.

12. The system of claim 8, wherein, to determine whether the given data includes the harmful content, the user device is configured to utilize a machine learning model to compare the determined pattern with the harmful patterns.

13. The system of claim 8, wherein the infrastructure device is configured to transmit, to the user device, a machine learning model to utilize for determining whether the given data includes the harmful content.

14. The system of claim 8, wherein the user device is configured to transmit, to the infrastructure device, feedback information associated determining whether the given data includes the harmful content.

15. A non-transitory computer-readable medium configured to store instructions, which when executed by an infrastructure device, configure the infrastructure device to:

determine a mixed set of harmful traits and clean traits, the harmful traits being associated with affected data known to include harmful content and the clean traits being associated with clean data known to be free of the harmful content;

determine harmful patterns indicating characteristics of the harmful traits based at least in part on comparing the affected data with the mixed set of the harmful traits and the clean traits, wherein a harmful pattern, from among the harmful patterns, indicates a particular combination of one or more of the harmful traits; and transmit, to a user device, the harmful patterns indicating the characteristics of the harmful traits; and when executed by the user device, configure the user device to:

determine a determined pattern based at least in part on traits included in given data;

determine whether the given data includes the harmful content based at least in part on comparing the determined pattern with the harmful patterns; and take action, based at least in part on determining that the given data includes the harmful content, to mitigate effects associated with the harmful content.

16. The non-transitory computer-readable medium of claim 15, wherein a harmful pattern, from among the harmful patterns, indicates a combination of a harmful trait and a clean trait.

17. The non-transitory computer-readable medium of claim 15, wherein a harmful pattern, from among the harmful patterns, indicates a number of times a particular harmful trait is included in the affected data.

18. The non-transitory computer-readable medium of claim 15, wherein a harmful pattern, from among the harmful patterns, indicates a particular arrangement of one or more of the harmful traits.

19. The non-transitory computer-readable medium of claim 15, wherein, to determine whether the given data includes the harmful content, the user device is configured to utilize a machine learning model to compare the determined pattern with the harmful patterns.

20. The non-transitory computer-readable medium of claim 15, wherein the infrastructure device is configured to transmit, to the user device, a machine learning model to utilize for determining whether the given data includes the harmful content.

* * * * *